United States Patent
Martincic

(10) Patent No.: US 11,074,142 B1
(45) Date of Patent: Jul. 27, 2021

(54) SYSTEMS AND METHODS FOR AUTOMATICALLY RESOLVING SYSTEM FAILURE THROUGH FORCE SUPPLYING CACHED API DATA

(71) Applicant: Coupang Corp., Seoul (KR)

(72) Inventor: Fernando Martincic, Seattle, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/149,899

(22) Filed: Jan. 15, 2021

(51) Int. Cl.
| | |
|---|---|
| *G06F 11/00* | (2006.01) |
| *G06F 11/14* | (2006.01) |
| *G06F 12/0875* | (2016.01) |
| *G06Q 30/02* | (2012.01) |
| *G06Q 30/06* | (2012.01) |

(Continued)

(52) U.S. Cl.
CPC .......... *G06F 11/1474* (2013.01); *G06F 9/541* (2013.01); *G06F 12/0875* (2013.01); *G06Q 30/0222* (2013.01); *G06Q 30/0236* (2013.01); *G06Q 30/0633* (2013.01); *G06F 2201/82* (2013.01); *G06F 2212/1008* (2013.01); *G06K 7/10297* (2013.01); *G06K 7/1413* (2013.01); *G06K 7/1417* (2013.01); *G06K 2007/10504* (2013.01); *G06Q 10/06398* (2013.01); *G06Q 10/0838* (2013.01); *G06Q 30/0623* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 6,557,054 B2* | 4/2003 | Reisman .................... | G06F 8/65 710/33 |
| 6,594,692 B1* | 7/2003 | Reisman .................... | G06F 8/65 709/219 |

(Continued)

OTHER PUBLICATIONS

Ro, Hyun-June Leonard. "Consumer Expectations of the Order Fulfillment Process: A Comparison of Direct-to-Consumer Purchases from a Canadian Perspective." International Journal of Retail & Distribution Management 41.4. (Year: 2012).*

(Continued)

*Primary Examiner* — Gurkanwaljit Singh
(74) *Attorney, Agent, or Firm* — Finnegan, Henderson, Farabow, Garrett & Dunner, LLP

(57) ABSTRACT

Systems and methods for force-supplying cached API call data are disclosed. A system may comprise a memory storing instructions and at least one processor configured to execute instructions to perform operations including: receiving initial order data from a user device, the initial order data comprising a product identifier, a user identifier, and a promotion identifier; determining an initial reduction amount based on the received product identifier and promotion identifier; mapping the initial reduction amount to a cache identifier; caching the initial order data and the cache identifier; receiving an order request from a device associated with the user identifier, the order request being associated with the promotion identifier; calling an API to complete the order request; detecting a failure of the API attempting to complete the order request; retrieving the cache identifier; determining a final reduction amount; and completing the order request using the final reduction amount.

20 Claims, 9 Drawing Sheets

(51) Int. Cl.
*G06F 9/54* (2006.01)
*G06Q 10/06* (2012.01)
*G06Q 10/08* (2012.01)
*G06K 7/14* (2006.01)
*G06K 7/10* (2006.01)

(56) References Cited

U.S. PATENT DOCUMENTS

| | | | |
|---|---|---|---|
| 10,102,111 B2* | 10/2018 | Rajagopalan | G06F 11/3672 |
| 10,810,112 B2* | 10/2020 | Rajagopalan | G06F 11/3672 |
| 2005/0289072 A1* | 12/2005 | Sabharwal | G06F 21/121 |
| | | | 705/59 |
| 2015/0348015 A1* | 12/2015 | Ren | G06Q 20/085 |
| | | | 705/41 |
| 2017/0006135 A1* | 1/2017 | Siebel | H04L 69/40 |
| 2017/0286951 A1* | 10/2017 | Ignatchenko | G06Q 20/3823 |
| 2018/0314624 A1* | 11/2018 | Rajagopalan | G06F 11/3672 |

OTHER PUBLICATIONS

Zachariadis, Markos, and Pinar Ozcan. "The API economy and digital transformation in financial services: The case of open banking." (2017). (Year: 2017).*

Lu, Qinghua, et al. "Cloud API issues: an empirical study and impact." Proceedings of the 9th international ACM Sigsoft conference on Quality of software architectures. 2013. (Year: 2013).*

* cited by examiner

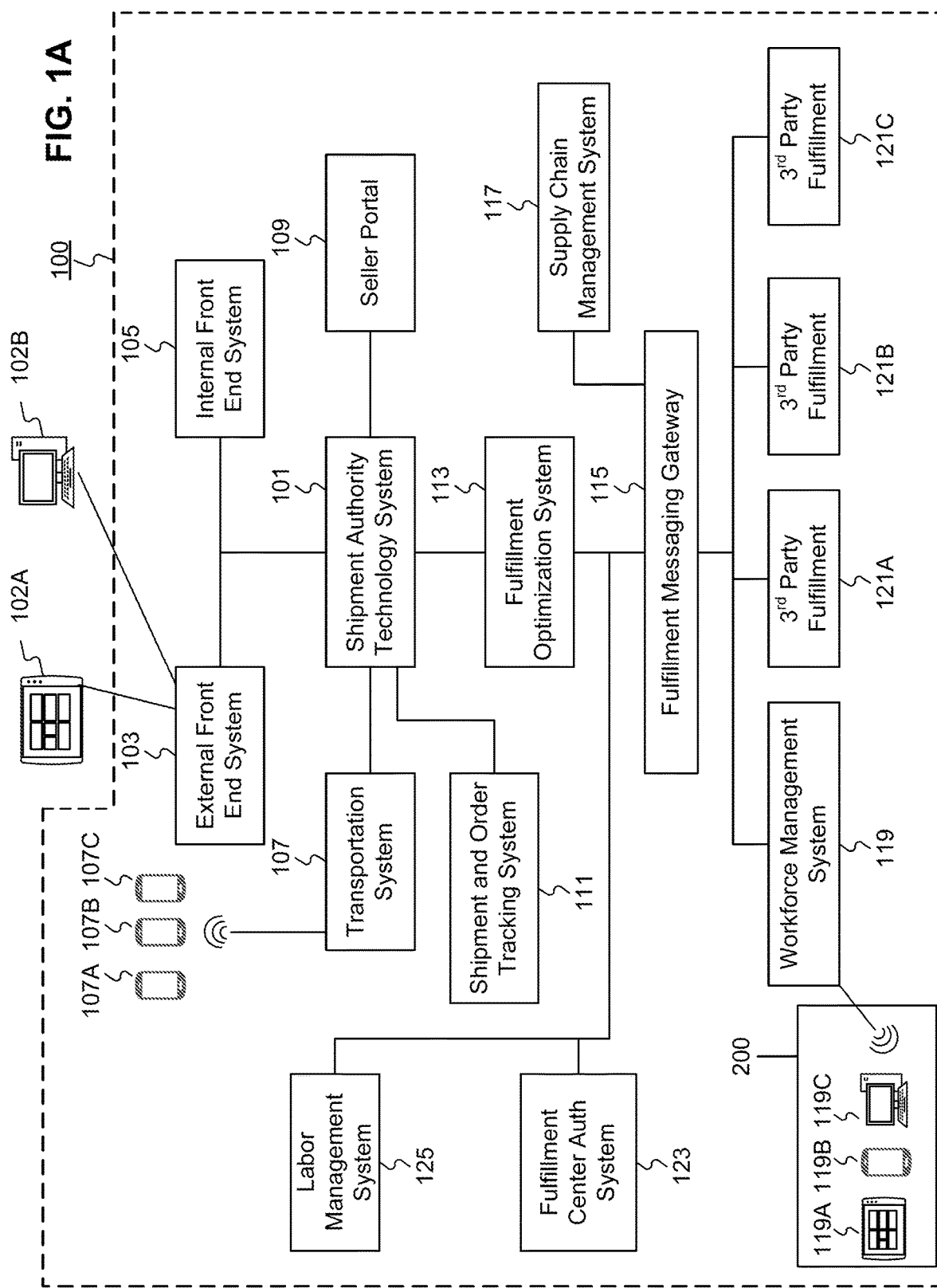

US 11,074,142 B1

SYSTEMS AND METHODS FOR AUTOMATICALLY RESOLVING SYSTEM FAILURE THROUGH FORCE SUPPLYING CACHED API DATA

TECHNICAL FIELD

Exemplary embodiments generally relate to systems and methods for force-supplying cached application program interface (API) call data. For example, disclosed techniques may include mapping an initial reduction amount to a cache identifier and caching initial order data and the cache identifier. Some techniques may include detecting a failure of an API and responding in part by retrieving the cache identifier.

BACKGROUND

In some situations, current systems process order requests from user devices in part by using multiple APIs that send API calls to each other that have various aspects of order request information. In some cases, order requests may include information related to items a user is contemplating purchasing, or actually intends to purchase. Sometimes, order requests may include promotion information, including discount information, which may be processed when received by an API.

Unfortunately, current systems experience time periods where a portion of the system, or even the entire system itself, experiences an outage (either planned or unplanned) or otherwise encounters an error when trying to process an order request from a user device. When the outage or error is resolved, the system typically attempts to process the order request again. However, in many cases, variables impacting the order request, such as eligibility for a discount, may have changed during the outage. Consequently, the system may re-examine the order request and reject it. Not only do these rejections degrade user experience, but they also lead to increased communications between the system and user device, which places a load on available bandwidth as well as on processing resources of both the system and the user device. With respect to the system, in some cases this can divert processing resources away from handling tasks and requests from other devices, slowing the response time of the system. Moreover, rejected order requests often result in remedial processes, which require further communication between the user device and the system, if not other systems as well, such as customer service APIs or phone lines. In some cases, order request data, including discount information, may be un-cached, thus requiring duplicate computations, which can be complex depending on numbers of items and discount possibilities, to be reperformed. This can drastically negatively affect computational resources for determining order information.

In view of these deficiencies of current order request systems, there is a need for improved systems and methods for force-supplying cached application program interface (API) call data, to better respond to system outages, errors, and failures, for example. The disclosed system and methods address one or more of the problems set forth above and/or other problems in the prior art.

SUMMARY

Consistent with the present embodiments, one aspect of the present disclosure is directed to a system for force-supplying cached application program interface (API) call data. The system may comprise a non-transitory computer-readable medium containing a set of storing instructions and at least one processor configured to execute instructions to perform steps. These steps may comprise receiving initial order data from a user device, the initial order data comprising a product identifier, a user identifier, and a promotion identifier; determining an initial reduction amount based on the received product identifier and promotion identifier; mapping the initial reduction amount to a cache identifier; caching the initial order data and the cache identifier; receiving an order request from a device associated with the user identifier, the order request being associated with the promotion identifier; calling an API to complete the order request; detecting, at a first time, a failure of the API attempting to complete the order request; retrieving the cache identifier; determining a final reduction amount; and completing the order request using the final reduction amount.

In another embodiment, detecting the failure of the API comprises detecting the API to be unresponsive to API calls.

In another embodiment, the API is detected to be unresponsive to API calls for a threshold period of time.

In another embodiment, the order request comprises the cache identifier; the steps further comprise placing the received order request in an asynchronous queue in response to detecting the failure of the API; and retrieving the cache identifier comprises retrieving the cache identifier from the order request at a second time.

In another embodiment, the final reduction amount is based on the retrieved cache identifier.

In another embodiment, initial order data is received in response to a user action of at least one of: navigating to a virtual shopping cart at the user device; or refreshing a virtual shopping cart at the user device.

In another embodiment, the initial order data is received as part of an API call generated in response to the user action.

In another embodiment, the steps further comprising generating the cache identifier to be unique with respect to other cache identifiers.

In another embodiment, generating the cache identifier comprises generating the cache identifier using a hash function.

In another embodiment, determining the final reduction amount comprises: determining the initial reduction amount using the cache identifier; determining a subsequent reduction amount based on the product identifier and the promotion identifier; comparing the initial reduction amount to the subsequent reduction amount; determining, based on the comparing, that the initial reduction amount equals the subsequent reduction amount; and based on the determining that the initial reduction amount equals the subsequent reduction amount, determining the final reduction amount to be the subsequent reduction amount.

In another embodiment, determining at least one of the initial reduction amount or the subsequent reduction amount comprises: determining a list of product identifiers associated with at least one of the initial order data or the order request; determining a plurality of promotion identifiers applicable to the product identifiers, the promotion identifiers being associated with multi-parameter promotion algorithms; determining at least two of the multi-parameter promotion algorithms to be mutually exclusive or mutually reinforcing; and computing at least one of the initial reduction amount or the subsequent reduction amount by using the determination of at least two of the multi-parameter promotion algorithms being mutually exclusive or mutually reinforcing to maximize at least one of the initial reduction amount or the subsequent reduction amount.

In another embodiment, determining the final reduction amount comprises: determining the initial reduction amount using the cache identifier; determining a subsequent reduction amount based on the product identifier and the promotion identifier; comparing the initial reduction amount to the subsequent reduction amount; determining, based on the comparing, that the initial reduction amount does not equal the subsequent reduction amount; and based on the determining that the initial reduction amount does not equal the subsequent reduction amount, determining the final reduction amount to be the initial reduction amount.

In another embodiment, the product identifier is a first product identifier; the initial order data further comprises a second product identifier; and determining the initial reduction amount is further based on the second product identifier.

In another embodiment, the steps further comprise determining, based on the user identifier, that a user of the user device is part of a membership group; and determining an initial reduction amount is further based on the user being part of the membership group.

Yet another aspect of the present disclosure is directed to a computer-implemented method for force-supplying cached API call data. The method may comprise receiving initial order data from a user device, the initial order data comprising a product identifier, a user identifier, and a promotion identifier; determining an initial reduction amount based on the received product identifier and promotion identifier; mapping the initial reduction amount to a cache identifier; caching the initial order data and the cache identifier; receiving an order request from a device associated with the user identifier, the order request being associated with the promotion identifier; detecting, at a first time, a failure of an attempt to complete the order request by an API; retrieving the cache identifier; determining a final reduction amount; and completing the order request using the final reduction amount.

Yet another aspect of the present disclosure is directed to a system for force-supplying cached API call data. The system may comprise a network interface and a first computing device. The first computing device may comprise at least one processor and a non-transitory computer-readable medium containing a set of instructions that, when executed by the at least one processor, cause the at least one processor to perform steps. The steps may comprise: receiving initial order data from a user device, the initial order data comprising a plurality of product identifiers, a user identifier, and a plurality of promotion identifiers; determining an initial reduction amount based on the received product identifiers and promotion identifiers; mapping the initial reduction amount to a cache identifier; caching the initial order data and the cache identifier; receiving an order request from a device associated with the user identifier, the order request being associated with the promotion identifiers; detecting, at a first time, a failure of an attempt to complete the order request by an API; retrieving the cache identifier; transmitting, using the network interface, the initial order data to a second computing device; receiving a subsequent reduction amount from the second computing device; comparing the initial reduction amount to the subsequent reduction amount; determining, based on the comparing, that the initial reduction amount does not equal the subsequent reduction amount; based on the determining that the initial reduction amount does not equal the subsequent reduction amount, and completing the order request using the initial reduction amount.

In another embodiment, the system may comprise a database storing associations between product data and the second computing device. The second computing device may comprise at least one processor a non-transitory computer-readable medium containing a set of instructions that, when executed by the at least one processor, cause the processor to perform steps. The steps may comprise receiving, from the first device, the product identifiers and the promotion identifiers, the promotion identifiers being associated with multi-parameter promotion algorithms; determining at least two of the multi-parameter promotion algorithms to be mutually exclusive or mutually reinforcing based on the associations stored in the database; computing the subsequent reduction amount by using the determination of at least two of the multi-parameter promotion algorithms being mutually exclusive or mutually reinforcing to maximize the subsequent reduction amount; and transmitting the maximized reduction amount to the first device.

Consistent with other disclosed embodiments, exemplary embodiments of non-transitory computer readable storage media may store program instructions, which may be executed by at least one processor device and perform any of the methods described herein.

The foregoing general description and the following detailed description provide exemplary embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

The disclosure is generally directed to automated systems and processes for coordinating the analysis, transmission, and management of order request API data.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
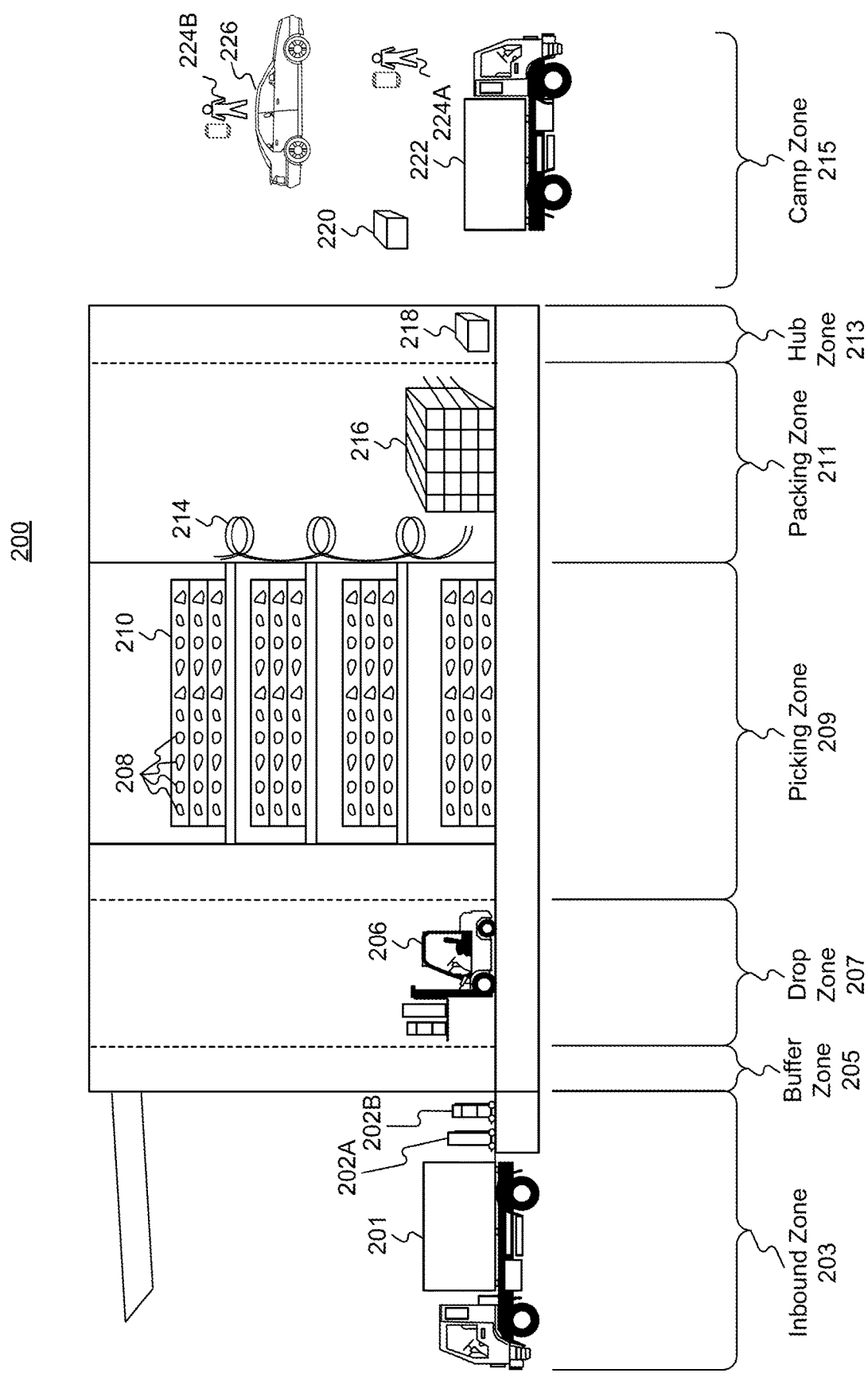
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119<i>6</i>.

Once a user places an order, a picker may receive an instruction on device 119<i>6</i> to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
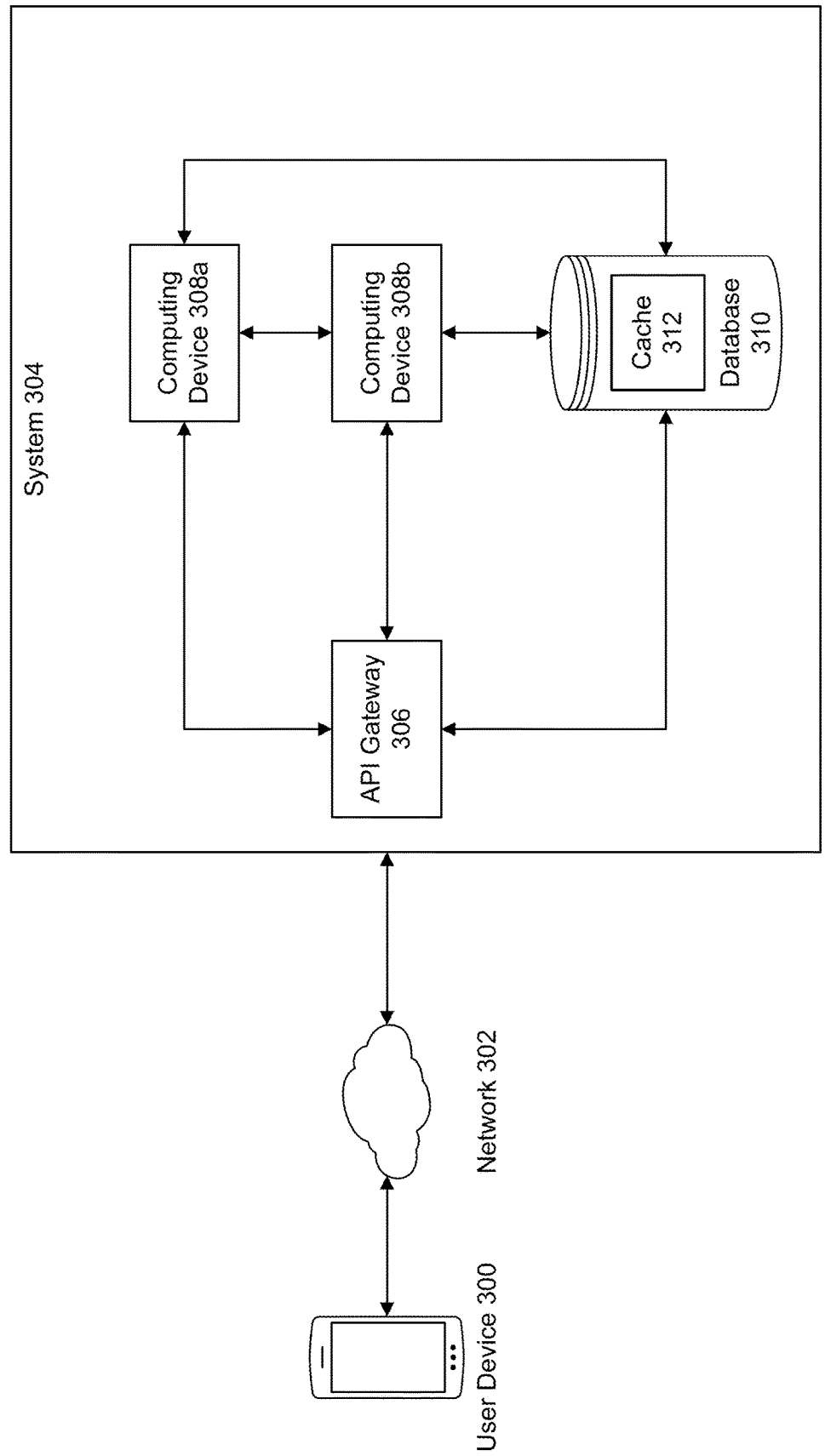
FIG. 3 illustrates an exemplary pictographic representation of a system architecture for handling order request information, consistent with disclosed embodiments.

FIG. 3 illustrates an exemplary pictographic representation of a system architecture 30 for handling order request information, consistent with disclosed embodiments. System architecture 30 may include a user device 300, which may be an instance of a computing device 400. User device 300 may be associated with a user attempting to generate and/or transmit order request data (e.g., API data). In some embodiments, user device 300 (e.g., mobile device 102A, computer 102B mobile device 119A, mobile device 119<i>6</i>, or mobile device 119C) may be associated with an administrator associated with system 304.

System architecture 30 may also include a network 302, which may communicably couple different devices (e.g., user device 300 and system 304). Network 302 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 302 may be connected to other networks (not depicted in FIG. 3) to connect the various system components to each other and/or to external systems or devices. In some embodiments, network 302 may be a secure network and require a password to access the network.

System architecture 30 may also include system 304, which may be associated with an online merchant, software support entity, computational support entity, and/or networking support entity. System 304 may include an API gateway 306, computing device 308*a*, computing device 308*b*, and/or database 310, all or any of which may be communicably coupled by at least one network interface (e.g., an instance of a network 302). System 304 may include an API gateway 306, which may receive and route API data (e.g., API calls) incoming and outgoing to and from system 304. For example, API gateway 306 may route information to and from computing device 308*a*, which may implement a first API, and may route information to and from computing device 308*b*, which may implement a second API. For example, user device 300 may connect to API gateway 306 wirelessly, such as through a network (e.g., an instance of network 302, described below), and communicate with devices of system 304. API gateway 306 may include a server, a router, a switch, an adapter, a group of networked devices, network interface, or other computing device. In some embodiments, API gateway 306 may operate using a mobile Application Program Interface (MAPI), according to which it may transmit and/or receive communications. In some embodiments, API gateway 306 may include a synchronous request controller and/or asynchronous request controller, which may allow a user device to perform asynchronous requests to respond to order request information, cache data, retrieve cached data, etc. By being configured for asynchronous requests, API gateway 306 may perform operations to complete a request from a user device (e.g., user device 300), while allowing the user device to continue performing operations. Moreover, API gateway 306 may be configured to receive a request from a user device while performing operations to satisfy an earlier received request.

System 304 may also include a computing device 308a and/or a computing device 308b. Computing device 308a and/or 308b may be an instance of computing device 400, discussed below. In some embodiments, computing device 308a may implement a first API, which may be configured to analyze, manipulate, transmit, and/or receive order request data and/or cached data. In some embodiments, computing device 308a may implement a second API, which may be configured to determine a reduction amount.

System 304 may also include database 310, which may store order request data, item data, price determination data, cross-data mapping information, a computerized model, an algorithm, or any other information for determining a reduction amount or completing an order request. For example, database 310 may store associations between product data, mappings between product identifiers and promotion identifiers, mappings between cache identifiers and initial reduction amounts, associations between combinations of product identifiers and reduction amounts, etc. Database 310 may include a cloud-based database (e.g., a Relational Database Service (RDS)) or an on-premises database. Database 310 may include data received from one or more components of system 304 and/or computing components outside system 304 (e.g., via network 302). In some embodiments, database 310 may include a cache 312, which may store cached data related to a user device 300 and/or an order request. For example, cache 312 may store a cache identifier, a reduction amount, order data (e.g., initial order data), mapping data (e.g., data linking a cache identifier to a reduction amount), or any other information related to handling order requests and reduction amounts. In some embodiments, database 310 may dynamically change the size of cache 312 based on present demand for cache resources. In some embodiments, cache 312 may exist on another device other than database 310, such as computing device 308a. In some embodiments, cache 312 may exist across multiple devices, as a segmented form and/or duplicated form of a dataset.

Figure 4:
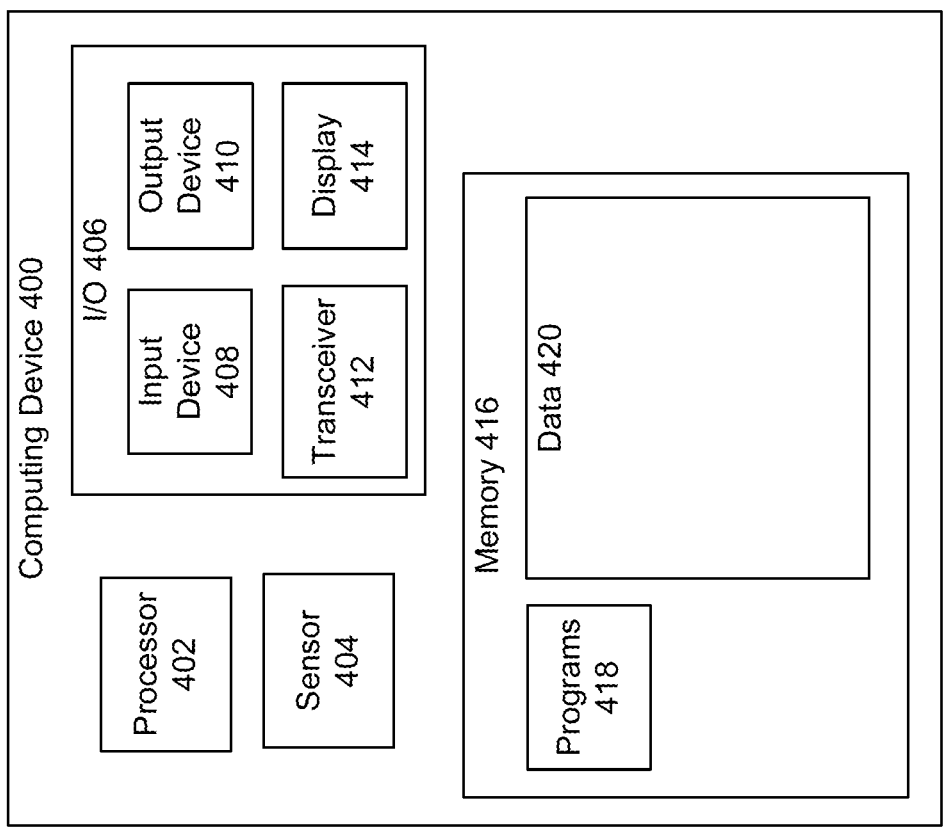
FIG. 4 illustrates an exemplary pictographic representation of a computing device for handling order request information, consistent with disclosed embodiments.

FIG. 4 illustrates an exemplary pictographic representation of computing device 400, which may be configured to carry processes described herein. In some embodiments, computing device 400 may be associated with a user, consumer, online shopper, online marketplace, shipping entity, software developer, company, and/or other entity involved with managing order requests. Computing device 400 may include a processor 402, which may include one or more dedicated processing units, application-specific integrated circuits (ASICs), field-programmable gate arrays (FPGAs), graphical processing units, or various other types of processors or processing units coupled with memory 416. Processor 402 may constitute a single-core or multiple-core processor that executes parallel processes simultaneously. For example, processor 402 may be a single-core processor configured with virtual processing technologies. In some embodiments, processor 402 may use logical processors to simultaneously execute and control multiple processes. Processor 402 may implement virtual machine technologies, or other known technologies to provide the ability to execute, control, run, manipulate, store, etc., multiple software processes, applications, programs, etc. In another embodiment, processor 402 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 402 may execute various instructions stored in memory 416 to perform various functions of the disclosed embodiments described in greater detail below. Processor 402 may be configured to execute functions written in one or more known programming languages.

Computing device 400 may also include a sensor 404, which may include an accelerometer, a light sensor, an audio sensor, an infrared sensor, a motion sensor, a piezoelectric sensor, a laser sensor, a sonar sensor, a GPS sensor, an electromagnetic sensor, and/or the like. In some embodiments, computing device 400 may perform an action based on an input received by sensor 404. For example, computing device 400 may transmit a notification to a display (e.g., display 414) when a motion sensor 404 determines that computing device 400 is in motion.

Computing device 400 may also include input/output (I/O) 176, which may include at least one of a display 414 (e.g., graphical display, textual display, light-emitting diode (LED) display, liquid crystal display (LCD) display, etc.), an LED, a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver (e.g., transceiver 412), an input device (e.g., input device 408), an output device (e.g., output device 410), or other I/O device to perform methods of the disclosed embodiments. I/O 406 may include components of an interface (e.g., a user interface). I/O 406 may also include a network interface (not shown), which may include at least one of a wired or wireless network card/chip set. For example, input device 408 may include a touch sensor, a mouse, a keyboard, or any device configured to allow for user input to computing device 400. As another example, output device 410 may include a speaker, display, haptic feedback device, or other device configured to produce output from computing device 400 to a user. Transceiver 412 may include a pluggable and/or optical transmission transceiver.

I/O 406 may include a display 414, which may display data or other information associated with the processes described herein. For example, display 414 may include an LCD, in-plane switching liquid crystal display (IPS LCD), LED display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. Display 414 may display graphical interfaces, interactable graphical elements, animations, dynamic graphical elements, and any other visual element.

Computing device 400 may also include memory 416, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 416 may include any number of hard disks, random access memories (RAMs), read-only memories (ROMs), erasable programmable read-only memories (EPROMs or Flash memories), and the like. Memory 416 may include one or more storage devices configured to store instructions usable by processor 402 to perform functions related to the disclosed embodiments. Memory 416 may also include any number of programs, applications, application program interfaces (APIs), or any other data, consistent with the disclosed embodiments.

In some embodiments, memory 416 may contain a number of application program interfaces (APIs). Memory 416 may store programs 418, which may include one or more programs (e.g., APIs, processes, modules, code, scripts, or functions) used to perform methods consistent with disclosed embodiments. Programs 418 may be written in one or more programming or scripting languages. Memory 416 may also maintain data 420, which may include data associated with a user account, an application, a particular device, a model, a communication, or any other data related to handling order requests. Data may be exchanged within a computing device 400 or between devices (e.g., computing device 308a and computing device 308b, a computing device 308a and a user device 300, etc.) in accordance with any number of formats or protocols, including XML, REST, SOAP, JSON, GraphQL, and the like.

Figure 5:
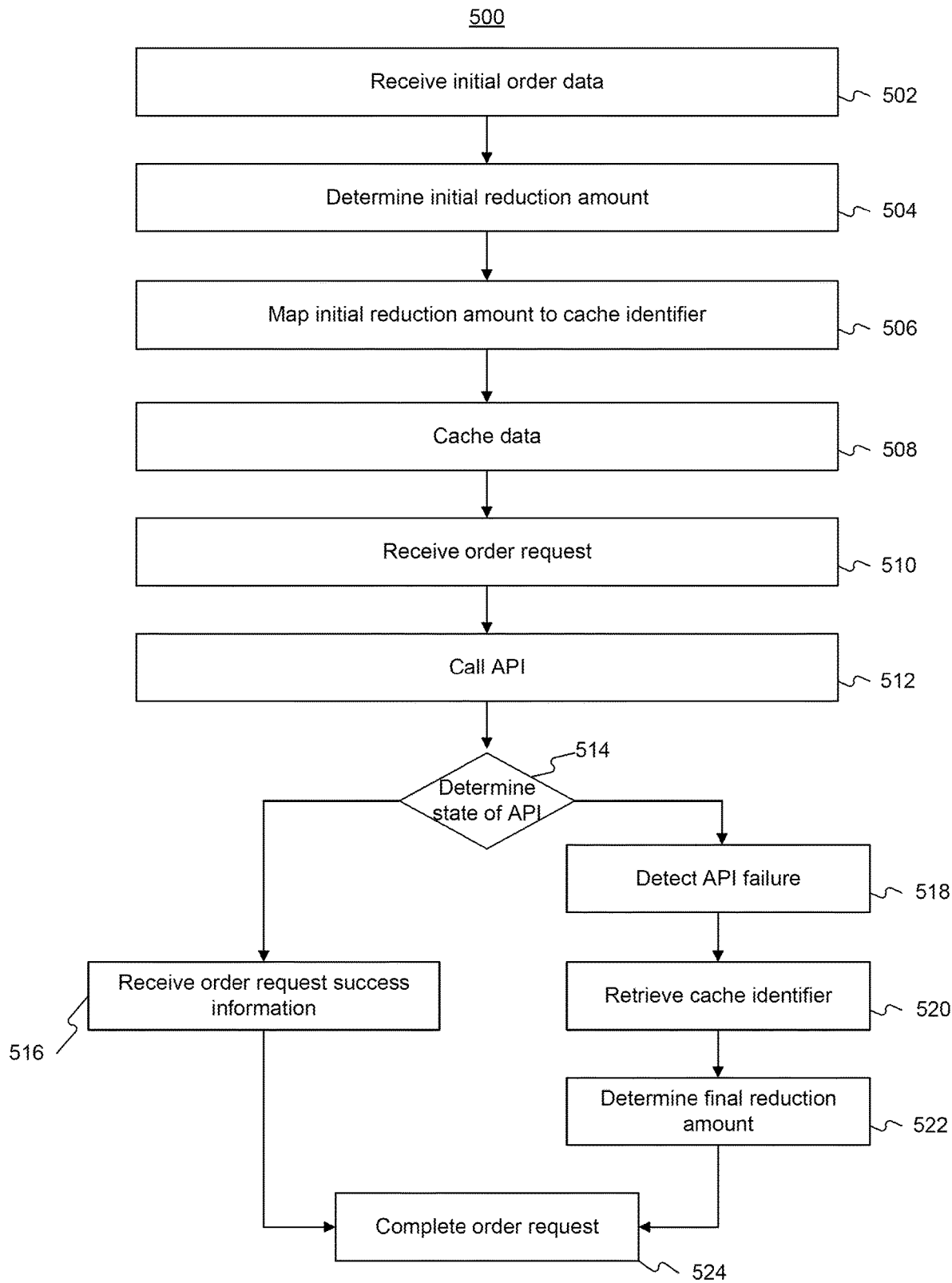
FIG. 5 depicts a flowchart of an exemplary process for force-supplying API data, consistent with disclosed embodiments.

FIG. 5 depicts a flowchart of an exemplary process 500 for force-supplying cached API call data, which may be performed by a processor in accordance with disclosed embodiments. For example, process 500 may be performed entirely or in part by user device 300 (e.g., using processor 402). Alternatively or additionally, some steps of process 500 may be performed by user device 300 and other steps may be performed by another device, such as computing device 308a and/or 308b. While process 500 is described with respect to computing device 308a, one of skill will understand that the steps illustrated in FIG. 5 are exemplary and steps may be added, merged, divided, duplicated, repeated, modified, and/or deleted in some embodiments.

At step 502, computing device 308a may receive initial order data, which may be received from a user device 300. In some embodiments, initial order data may include a product identifier, a device identifier; a session identifier; a user identifier, and/or a promotion identifier. In some embodiments, the initial order data may comprise a plurality of product identifiers (e.g., a first and second product identifier), a user identifier, and a plurality of promotion identifiers (e.g., a first and second promotion identifier). In some embodiments, a user device 300 may generate initial order data based on at least one user interaction performed at user device 300. For example, the initial order data may be received in response to a user action of at least one of: navigating to a virtual shopping cart at the user device or refreshing a virtual shopping cart at the user device. By way of further example, a user may make interact with graphical user interface (GUI) elements at user device 300 to place virtual items (which may correspond to real world items) into a virtual shopping cart. In some embodiments, a virtual item may be associated with a reduction amount, such as through a discount or other promotion.

In some embodiments, placing a virtual item into a virtual shopping cart, refreshing a shopping application at user device 300, or taking another action at user device 300 may cause user device 300 to determine information associated with the virtual item, such as a promotion identifier, reduction amount, and/or other promotion information. For example, after a virtual item is placed in a virtual shopping cart, user device 300 may query another device (e.g., computing device 308a) for promotion information (e.g., a promotion identifier) related to a virtual item in a user's virtual shopping cart. In some embodiments, a promotion identifier may be generated to be unique with respect to other promotion identifiers. For example, a hashing algorithm or other key generation process may be applied to a product identifier, reduction amount, and/or other promotion parameters, to generate a unique promotion identifier.

In some embodiments, the initial order data may be received as part of an API call generated in response to a user action. For example, in response to a user selection of a graphical element at user device 300, user device 300 may generate an API call, which it may transmit to system 304. An API call may include at least a portion of the initial order data, may be configured to prompt a device to perform computations, mapping operations, data manipulation operations, and/or any other operation associated with handling order information. For example, in some embodiments, an order request may include an API call generated by a virtual shopping cart API at a user device 300, and the generated API call may be configured to call a "find" API to compile a line-item receipt containing product identifiers and/or promotion information (e.g., based on mapped data retrieved by the "find" API using a cache identifier. In some embodiments, the order request may be associated with a promotion identifier (e.g., received at step 502).

At step 504, computing device 308a may determine an initial reduction amount, which may be based on a received product identifier and/or a received promotion identifier. For example, in some embodiments, a product identifier may be mapped to a promotion identifier, which may be in turn mapped to promotion information (e.g., an algorithm, fixed amount, time parameter, quantity parameter, etc.). In some embodiments, computing device 308a may determine the initial reduction amount based on multiple product identifiers and/or multiple promotion identifiers. For example, the product identifier may be a first product identifier and the initial order data may also include a second product identifier. Continuing this example, computing device 308a may determine the initial reduction amount further based on the second product identifier (e.g., in addition to the first product identifier).

In some embodiments, an initial reduction amount may be based on a user identifier, which may be included in the initial order data. For example, computing device 308a may determine, based on a user identifier, that a user of the user device is part of a membership group, and may also determine the initial reduction amount based on the user being part of the membership group (e.g., using a promotion algorithm having a group membership constraint). It should be noted that an initial reduction amount may also be determined using techniques for determining a subsequent reduction amount, discussed further below.

At step 506, computing device 308a may map the initial reduction amount to a cache identifier. In some embodiments, computing device 308a may also generate the cache identifier. For example, computing device 308a may generate the cache identifier to be unique with respect to other cache identifiers (e.g., cache identifiers generated in response to initial order data received from other client devices 300). In some embodiments, generating a cache identifier may comprise generating the cache identifier using a hash function (e.g., radix conversion hashing, a rolling hash, etc.).

At step 508, computing device 308a may cache data, which may include caching the initial order data, the initial reduction amount, and/or the cache identifier. This may allow for fast retrieval of information without requiring re-computation, which may allow for responding to API failures in a faster and less resource-intensive manner.

At step 510, computing device 308a may receive an order request, which may be an order request from a device (e.g., mobile device 102A, computer 102B mobile device 119A, mobile device 119b, or mobile device 119C) associated with a user identifier (e.g., a user identifier of initial order data received at step 502). In some embodiments, the order request may be associated with (e.g., the order request may include) a single product identifier and/or a single promotion identifier. In other embodiments, the order request may be associated with (e.g., the order request may include) multiple product identifiers and/or multiple promotion identifiers. In some embodiments, the order request may include at least a portion of the initial order data, and may also include data in addition to any of the initial order data (e.g., additional product identifiers not included in the initial order data, which may have been generated in response to additional products being placed in a virtual shopping cart). In some embodiments, the order request may comprise a cache identifier.

At step 512, a device (e.g., API gateway 306, computing device 308a, computing device 308b, etc.) may call an API to complete the order request (e.g., an API implemented by computing device 308a). For example, API gateway 306 may call an API based on the order request received at step 510. In some embodiments, API gateway 306 may call an API configured to complete an order request based on an indication (e.g., true Boolean value) in the order request to complete an order. In some embodiments, the API call may contain at least a portion of the order request.

At step 514, computing device 308a may determine a state of an API (e.g., a transaction API). For example, an API may be fully functioning (e.g., responsive, providing order completion data, etc.), partially functioning (e.g., producing some error), or not functioning (e.g., unresponsive, failing). For example, the API may be suffering from an outage, glitch, etc. and may not respond to an API call (e.g., an API call to complete an order request, retrieve information, etc.). In some embodiments the API may be detected to be unresponsive to API calls for a threshold period of time (e.g., a number of milliseconds, seconds, minutes, etc.). In some embodiments, the threshold period of time may be associated with a service-level agreement (SLA). In some embodiments, the API may be functioning within a tolerance (e.g., a response time threshold, bandwidth throughput, etc.). If computing device 308a determines that the API is functioning properly, it may proceed to step 516.

At step 516, computing device 308a may receive order request success information. For example, computing device 308a may receive an indication that order information was transmitted to and/or received by another device (e.g., order placement information was received by a device associated with a warehouse).

At step 518, computing device 308a may detect a failure of the API attempting to complete the order request. In some embodiments, computing device 308a may detect such a failure at a first time. In some embodiments, detecting the failure of the API may comprise detecting the API to be unresponsive to API calls. In some embodiments, computing device 308a may place the received order request in an asynchronous queue, which may include other order requests, in response to detecting the failure the API. In some embodiments, the order request in the asynchronous queue may include user information (e.g., user identifier, user device identifier, profile identifier, etc.), at least one product identifier, at least one promotion identifier, and/or a cache identifier.

At step 520, computing device 308a may retrieve a cache identifier, which may be a cache identifier mapped to an initial reduction amount at step 506. In some embodiments, retrieving the cache identifier may comprise retrieving the cache identifier from the order request at a second time. In some embodiments, the second time may be a time when computing device 308a determines that the API is no longer unresponsive. In some embodiments at step 520, computing device 308a may retrieve the initial reduction amount mapped to the cache identifier.

At step 522, computing device 308a may determine a final reduction amount. In some embodiments, the final reduction amount may be based on the retrieved cache identifier. In some embodiments, computing device 308a may determine the initial reduction amount from the received cache identifier using the mapping between the cache identifier and the initial reduction amount, and may determine the final reduction amount to be the initial reduction amount.

In some embodiments, determining the final reduction amount may comprise determining the initial reduction amount using the cache identifier and determining a subsequent reduction amount based on the product identifier and the promotion identifier. In some embodiments, the subsequent reduction amount may be determined by computing device 308b. For example, computing device 308a may transmit, such as by using a network interface, initial order data to a second computing device (e.g., computing device 308b, which may determine the subsequent reduction amount.

In some embodiments, computing device 308b may receive, from a first device (e.g., computing device 308a, API gateway 306, etc.), product identifiers and promotion identifiers. Merely by way of example, a promotion identifier may be linked with a virtual coupon that a user has placed within a virtual shopping cart on user device 300. In some embodiments, the promotion identifiers may be associated with multi-parameter promotion algorithms. A multi-parameter promotion algorithm may be an algorithm for determining a reduction amount (e.g., a discount), and may include a combination of parameters, such as a product identifier parameter, a product number parameter (e.g., a criteria for a number of an item in a virtual shopping cart), a product combination parameter, a purchase amount parameter, a time parameter (e.g., a time constraint), a location parameter (e.g., a location constraint), a promotion limit parameter, and/or a shipping parameter (e.g., a shipping speed selection constraint).

Computing device 308b may apply at least one promotion algorithm to the product identifiers and promotion identifiers, as well as other parameters (e.g., location, timing parameters). In some embodiments, computing device 308b may ignore a particular parameter based on detecting an API failure. For example, computing device 308b may ignore a time parameter, which may be configured to limit the application of a promotion algorithm to a particular time period. As another example, computing device 308b may ignore a promotion quantity limit parameter, which may set a total number of times a particular promotion algorithm can be applied by a computing device (e.g., for multiple order requests from multiple user devices). By ignoring a parameter due to an API failure, a user device 300 may have its order request completed with a reduction amount, which may not have otherwise been permitted by the promotion algorithm, improving user experience while simultaneously reducing the amount of inter-device communication and processing resource usage that may result from order request failure.

In some embodiments, computing device 308b may determine at least two of the multi-parameter promotion algorithms to be mutually exclusive or mutually reinforcing based on associations stored in database 310. As an example of a mutually exclusive algorithm, an order request may satisfy a criterion of a product identifier parameter for one algorithm, but may fail a criteria of a product identifier parameter for another algorithm. As an example of a mutually reinforcing algorithm, an order request may satisfy a criterion of a product identifier (e.g., an identifier of a product that may be associated with a particular purchase amount) parameter and may also satisfy a criterion of a purchase amount parameter.

In some embodiments, computing device 308b may determine multi-parameter promotion algorithms to be mutually exclusive or mutually reinforcing in different ways. For example, computing device 308b may determine multi-parameter promotion algorithms to be mutually exclusive or mutually reinforcing by comparing parameters between algorithms (e.g., static analysis). In some embodiments, computing device 308b may determine multi-parameter promotion algorithms to be mutually exclusive or mutually reinforcing by using machine-learning or similar techniques. For example, computing device 308b may simulate applications of combinations of order request information (e.g., combinations of product identifiers, product quantities, location information, time information, etc.) and promotion information, and may determine corresponding reduction amounts, trends in reduction amounts (e.g., particular combinations leading to increases or decreases in reduction amounts). After determining a mutually exclusive or mutually reinforcing relationship between algorithms, computing device 308b may create an association describing the relationship and store the association in database 310. Such an association may be the result of intensive complex computations, and storing the association in database 310 may allow for quick retrieval and application of the association to an order request without waiting for a computation or simulation process to terminate.

As mentioned above, in some embodiments, computing device 308b may compute a subsequent reduction amount (e.g., after receiving initial order data from computing device 308a or another device). In some embodiments, determining at least one of the initial reduction amount or the subsequent reduction amount may include determining a list of product identifiers associated with at least one of the initial order data or the order request and determining a plurality of promotion identifiers applicable to the product identifiers. In some embodiments, the promotion identifiers may be associated with multi-parameter promotion algorithms. For some embodiments, determining at least one of the initial reduction amount or the subsequent reduction amount may include determining at least two of the multi-parameter promotion algorithms to be mutually exclusive or mutually reinforcing and computing at least one of the initial reduction amount or the subsequent reduction amount by using the determination of at least two of the multi-parameter promotion algorithms being mutually exclusive or mutually reinforcing to maximize at least one of the initial reduction amount or the subsequent reduction amount.

For example, computing device 308b may compute the subsequent reduction amount by using the determination that at least two of the multi-parameter promotion algorithms are mutually exclusive or mutually reinforcing (e.g., as described above) to maximize the subsequent reduction amount. By way of example, computing device 308b may determine that an applicable second promotion algorithm should be applied with a first promotion algorithm, which may lead to an increase in the subsequent reduction amount. In some embodiments, computing device 308b may transmit a maximized reduction amount to a first device (e.g., computing device 308a). Thus, in some embodiments, computing device 308a may receive the subsequent reduction amount from the second computing device (e.g., computing device 308b).

In some embodiments, computing device 308a may compare the initial reduction amount to the subsequent reduction amount and may determine, based on the comparing, that the initial reduction amount equals the subsequent reduction amount. In some embodiments, computing device 308a may, based on the determining that the initial reduction amount equals the subsequent reduction amount, determine the final reduction amount to be the subsequent reduction amount. In some embodiments, computing device 308a may compare the initial reduction amount to the subsequent reduction amount and may instead determine, based on the comparing, that the initial reduction amount does not equal the subsequent reduction amount. In some embodiments, computing device 308a may, based on the determining that the initial reduction amount does not equal the subsequent reduction amount, determine the final reduction amount to be the initial reduction amount (e.g., rather than the subsequent reduction amount).

At step 524, computing device 308a may complete the order request (e.g., received at step 510). In some embodiments, computing device 308a may complete the order request using the final reduction amount. For example, an order request may be completed by force-supplying a final reduction amount that is based on an initial reduction amount (e.g., cached data) to an order completion API. In some embodiments, force-supplying the final reduction amount may cause the order completion API to override a constraint (e.g., a constraint of a promotion algorithm). Completing the order request may include, without limitation, examining in-stock quantities (e.g., querying a stock-keeping device for in-stock quantities, sending a notification to a worker device), transmitting information to a warehouse device (e.g., a worker user device, an automated stocking device, etc.), generating a confirmation notification for a user device 300, and/or retrieving or transmitting any information for responding to the order request. In some embodiments, completing the order request may include determining a theoretical reduction amount scenario. For example, computing device 308a may determine that an order request came within a threshold of satisfying an additional promotion algorithm, and may present that information to a user device 300. For example, computing device 308a may determine that an order request would have satisfied an additional promotion algorithm if the order request had included an additional item, and may transmit a notification to a user device 300 that includes an identifier of the additional item.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer programs based on the written description and methods of this specification are within the skill of a software developer. The various functions, scripts, programs, or modules can be created using a variety of programming techniques. For example, computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages (including an object oriented programming language and/or conventional procedural programming language) such as Smalltalk, C++, JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively for any number of iterations, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Moreover, while exemplary embodiments have been described herein, these have been presented for purposes of illustration, but are not intended to be exhaustive or limited to the embodiments disclosed, such that the scope includes any and all embodiments having equivalent elements, modifications, variations, omissions, combinations (e.g., of aspects across various embodiments), adaptations or alterations, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A system for force-supplying cached application program interface (API) call data, the system comprising:
   at least one processor; and
   a non-transitory computer-readable medium containing a set of instructions that, when executed by the at least one processor, cause the processor to perform steps comprising:
      receiving initial order data from a user device, the initial order data comprising a product identifier, a user identifier, and a promotion identifier;
      determining an initial reduction amount based on the received product identifier and promotion identifier;
      mapping the initial reduction amount to a cache identifier;
      caching the initial order data and the cache identifier;
      receiving an order request from a device associated with the user identifier, the order request being associated with the promotion identifier;
      calling an API to complete the order request;
      detecting, at a first time, a failure of the API attempting to complete the order request;
      retrieving the cache identifier;
      determining a final reduction amount; and
      completing the order request using the final reduction amount.

2. The system of claim 1, wherein detecting the failure of the API comprises detecting the API to be unresponsive to API calls.

3. The system of claim 2, wherein the API is detected to be unresponsive to API calls for a threshold period of time.

4. The system of claim 2, wherein:
   the order request comprises the cache identifier;
   the steps further comprise placing the received order request in an asynchronous queue in response to detecting the failure of the API; and
   retrieving the cache identifier comprises retrieving the cache identifier from the order request at a second time.

5. The system of claim 1, wherein the final reduction amount is based on the retrieved cache identifier.

6. The system of claim 1, wherein the initial order data is received in response to a user action of at least one of:
   navigating to a virtual shopping cart at the user device; or
   refreshing a virtual shopping cart at the user device.

7. The system of claim 6, wherein the initial order data is received as part of an API call generated in response to the user action.

8. The system of claim 1, the steps further comprising generating the cache identifier to be unique with respect to other cache identifiers.

9. The system of claim 8, wherein generating the cache identifier comprises generating the cache identifier using a hash function.

10. The system of claim 1, wherein determining the final reduction amount comprises:
    determining the initial reduction amount using the cache identifier;
    determining a subsequent reduction amount based on the product identifier and the promotion identifier;
    comparing the initial reduction amount to the subsequent reduction amount;
    determining, based on the comparing, that the initial reduction amount equals the subsequent reduction amount; and
    based on the determining that the initial reduction amount equals the subsequent reduction amount, determining the final reduction amount to be the subsequent reduction amount.

11. The system of claim 10, wherein determining at least one of the initial reduction amount or the subsequent reduction amount comprises:
    determining a list of product identifiers associated with at least one of the initial order data or the order request;
    determining a plurality of promotion identifiers applicable to the product identifiers, the promotion identifiers being associated with multi-parameter promotion algorithms;
    determining at least two of the multi-parameter promotion algorithms to be mutually exclusive or mutually reinforcing; and
    computing at least one of the initial reduction amount or the subsequent reduction amount by using the determination of at least two of the multi-parameter promotion algorithms being mutually exclusive or mutually reinforcing to maximize at least one of the initial reduction amount or the subsequent reduction amount.

12. The system of claim 1, wherein determining the final reduction amount comprises:
    determining the initial reduction amount using the cache identifier;
    determining a subsequent reduction amount based on the product identifier and the promotion identifier;
    comparing the initial reduction amount to the subsequent reduction amount;
    determining, based on the comparing, that the initial reduction amount does not equal the subsequent reduction amount; and
    based on the determining that the initial reduction amount does not equal the subsequent reduction amount, determining the final reduction amount to be the initial reduction amount.

13. The system of claim 1, wherein:
    the product identifier is a first product identifier;
    the initial order data further comprises a second product identifier; and
    determining the initial reduction amount is further based on the second product identifier.

14. The system of claim 1, wherein:
the steps further comprises determining, based on the user identifier, that a user of the user device is part of a membership group; and
determining an initial reduction amount is further based on the user being part of the membership group.

15. A computer-implemented method for force-supplying cached API call data, comprising:
receiving initial order data from a user device, the initial order data comprising a product identifier, a user identifier, and a promotion identifier;
determining an initial reduction amount based on the received product identifier and promotion identifier;
mapping the initial reduction amount to a cache identifier;
caching the initial order data and the cache identifier;
receiving an order request from a device associated with the user identifier, the order request being associated with the promotion identifier;
detecting, at a first time, a failure of an attempt to complete the order request by an API;
retrieving the cache identifier;
determining a final reduction amount; and
completing the order request using the final reduction amount.

16. The computer-implemented method of claim 15, wherein detecting the failure of the API comprises detecting the API to be unresponsive to API calls.

17. The computer-implemented method of claim 16, wherein the API is detected to be unresponsive to API calls for a threshold period of time.

18. The computer-implemented method of claim 16, wherein:
the order request comprises the cache identifier;
the steps further comprise placing the received order request in an asynchronous queue in response to detecting the failure of the API; and
retrieving the cache identifier comprises retrieving the cache identifier from the order request at a second time.

19. A system for force-supplying cached API call data, the system comprising:
a network interface;
a first computing device comprising:
at least one processor; and
a non-transitory computer-readable medium containing a set of instructions that, when executed by the at least one processor, cause the processor to perform steps comprising:
receiving initial order data from a user device, the initial order data comprising a plurality of product identifiers, a user identifier, and a plurality of promotion identifiers;
determining an initial reduction amount based on the received product identifiers and promotion identifiers;
mapping the initial reduction amount to a cache identifier;
caching the initial order data and the cache identifier;
receiving an order request from a device associated with the user identifier, the order request being associated with the promotion identifiers;
detecting, at a first time, a failure of an attempt to complete the order request by an API;
retrieving the cache identifier;
transmitting, using the network interface, the initial order data to a second computing device;
receiving a subsequent reduction amount from the second computing device;
comparing the initial reduction amount to the subsequent reduction amount;
determining, based on the comparing, that the initial reduction amount does not equal the subsequent reduction amount;
based on the determining that the initial reduction amount does not equal the subsequent reduction amount, and
completing the order request using the initial reduction amount.

20. The system of claim 19, further comprising:
a database storing associations between product data; and
the second computing device, the second computing device comprising:
at least one processor; and
a non-transitory computer-readable medium containing a set of instructions that, when executed by the at least one processor, cause the processor to perform steps comprising:
receiving, from the first device, the product identifiers and the promotion identifiers, the promotion identifiers being associated with multi-parameter promotion algorithms;
determining at least two of the multi-parameter promotion algorithms to be mutually exclusive or mutually reinforcing based on the associations stored in the database;
computing the subsequent reduction amount by using the determination of at least two of the multi-parameter promotion algorithms being mutually exclusive or mutually reinforcing to maximize the subsequent reduction amount; and
transmitting the maximized reduction amount to the first device.

* * * * *